United States Patent

Ehrler et al.

Patent Number: 6,020,714
Date of Patent: Feb. 1, 2000

[54] CONTROL SYSTEM FOR A DRIVE HAVING AN ASYNCHRONOUS MOTOR

[75] Inventors: Urs Ehrler, Gebenstorf; Stefan Menth, Baden, both of Switzerland

[73] Assignee: ABB Daimler-Benz Transportation (Technology) GmbH, Berlin, Germany

[21] Appl. No.: 09/087,807

[22] Filed: Jun. 1, 1998

[30] Foreign Application Priority Data

Jun. 30, 1997 [DE] Germany .......................... 197 27 507

[51] Int. Cl.[7] .................................................. H02P 5/28
[52] U.S. Cl. .............................................. 318/807; 318/52
[58] Field of Search .................................. 318/52, 85–87, 318/139, 807; 180/197, 65.1–65.8; 291/2; 105/49, 73, 76

[56] References Cited

U.S. PATENT DOCUMENTS

| | | | |
|---|---|---|---|
| 3,916,275 | 10/1975 | Plunkett et al. | 318/231 |
| 4,335,337 | 6/1982 | Okamatsu et al. | 318/52 |
| 4,719,861 | 1/1988 | Savage et al. | 104/165 |
| 5,289,093 | 2/1994 | Jobard | 318/434 |
| 5,345,155 | 9/1994 | Masaki et al. | 318/138 |
| 5,480,220 | 1/1996 | Kumar | 303/151 |

FOREIGN PATENT DOCUMENTS

| | | |
|---|---|---|
| 0699553A1 | 3/1996 | European Pat. Off. . |
| 4110225C2 | 10/1992 | Germany . |
| 4215917A1 | 11/1993 | Germany . |
| 19530622A1 | 10/1996 | Germany . |
| 3714404C2 | 11/1998 | Germany . |

OTHER PUBLICATIONS

"Direkte Selstregelung, ein neuartiges Regelverfahren, etc.", Janecke, et al., eb—Elektrische Bahnen 89, 1991, pp. 79–87.
"Radschlupfregelung fur Drehstromlokomotiven", Buscher, et al., eb—Elektrische Bahnen 91, 1993, pp. 163–178.
"Transistorwechselrichter fur Nahverkehrstriebfahrzeuge", Tietze, et al., eb—Elektrische Bahnen 91, 1993, pp. 341–347.
"Regelungstechnische Bedampfung der Reibschwingungen im Antriebsstrang von Drehstromtriebfahrzeugen", Jockel, et al., eb—Elektrische Bahnen 93, 1995, pp. 151–157.

*Primary Examiner*—Robert E. Nappi
*Assistant Examiner*—Rina I. Duda
*Attorney, Agent, or Firm*—Burns, Doane, Swecker & Mathis, L.L.P.

[57] ABSTRACT

In the case of a control system (140) for a drive having an asynchronous motor, in particular for a railroad vehicle, which control system (140) comprises a first control loop (141) for motor control, and a second control loop (142) which is connected to the first control loop (141) and has an adhesion controller (125), an improved control response is obtained in that the motor control system is designed as a stator frequency control system (127), and in that an actual torque value ($M_{act}$) for the asynchronous motor is derived within the motor control system, and in that the two control loops (141, 142) are connected to one another in such a manner that the actual torque value ($M_{act}$) from the motor control system is used as the actual value for the adhesion controller (125), and in that the adhesion controller (125) presets a nominal stator frequency value ($f_{s,nom}$) for the motor control system.

7 Claims, 8 Drawing Sheets

CONTROL SYSTEM FOR A DRIVE HAVING AN ASYNCHRONOUS MOTOR

This application claims priority under 35 U.S.C. §§119 and/or 365 to No. 197 27 507.9 filed in Germany on Jun. 30, 1997; the entire content of which is hereby incorporated by reference.

BACKGROUND OF THE INVENTION

1. Field of the Invention

The present invention relates to the field of electric drives. It refers to a control system for a drive having an asynchronous motor, in particular for a railroad vehicle, which control system comprises a first control loop for motor control and a second control loop, which is connected to the first control loop and has an adhesion controller.

Such a control system, in which the motor control is torque-based and the nominal torque for motor control is emitted by the higher-level adhesion controller on the basis of the rotation speed measured on the motor shaft, is known from the prior art.

2. Discussion of Background

In the case of electrically driven locomotives having torque-controlled drive motors in the form of asynchronous motors (ASM), wheel-slip situations can occur, in which the drive wheels spin to a greater or lesser extent in an uncontrolled manner. This results in unstable operation, in which the maximum possible traction between the wheel and rail is not achieved. At the same time, the drive wheels and the rails are subject to increased wear.

A large number of solution proposals as well as practically implemented methods exist to overcome the problem. One known torque-based control system is shown, by way of example, in FIGS. 1 to 4: the method is based on a cascade of two control loops, which can be seen in the schematic illustration in FIG. 1. The control system 100 comprises the process 104, the motor controller 103, the adhesion controller 102 and, possibly, an intermediate-circuit antiphase controller 101. For its part, according to FIG. 2, the process 104 comprises an invertor 108, which is connected on the input side via an intermediate-circuit capacitor 107 to a DC intermediate circuit 105 and is controlled via switching commands $S_R$, $S_S$ and $S_T$, and an asynchronous motor 113, which is supplied by the invertor 108 and, via a motor shaft 112, a gearbox 114 and a wheel 115, attempts to transmit power via appropriate friction to the rail 116. A rotation speed sensor 111 is fitted on the motor shaft 112, measures the rotation speed $n_{shaft}$ of the motor shaft 112, and emits this rotation speed $n_{shaft}$ to the control system for further processing. Other input variables required for the control system are two of the three phase currents $i_R$ and $i_S$, which are tapped off from the supply cables via current sensors 109 and 110, as well as the intermediate-circuit voltage $u_d$, which is measured by a voltage sensor 106 in the intermediate circuit 105.

The variables $u_d$, $i_{R,S}$ and $n_{shaft}$ obtained from the process 104 are fed back to the motor controller 103. By comparison with a predetermined dynamic nominal torque value $M_{s,nom}$, these variables are used in the motor controller 103 to derive the control commands $S_{R,S,T}$ for the invertor 108, and to pass said commands to the process 104. The derivation is carried out, for example, in the starting range in accordance with the block diagram (illustrated in FIG. 3) of the so-called indirect self-control system ISR, as is known from the document Elektrische Bahnen [Electric railroads] 89(1991), Issue 3, pages 79–87: a so-called motor monitor 117, that is to say a computation circuit which contains models of the invertor 108 and of the asynchronous motor, uses the said input variables to calculate an actual stator flux value $Psi_{act}$ and an actual torque value $M_{act}$ for the asynchronous motor 113.

A flux controller 118 uses the difference between a predetermined nominal stator flux value $Psi_{nom}$ and the actual stator flux value $Psi_{act}$ to derive a stator flux correction value $k_{Psi}$. A torque controller 119 uses the difference between a predetermined dynamic nominal torque value $M_{s,nom}$ and the actual torque value $M_{act}$ to derive a dynamic nominal stator frequency $f_{s,nom}$ which, together with a steady-state nominal stator frequency $f_{T,nom}$ produces the nominal stator frequency $f_{nom}$. The nominal stator frequency $f_{T,nom}$ is obtained via an initial controller 120 from the nominal torque value $M_{s,nom}$ and by superimposition of the rotation speed $n_{shaft}$. A first calculation block 121 uses the input variables $k_{Psi}$ and $f_{nom}$ to calculate the change $\Delta Psi$ in the stator flux vector, and a second calculation block 122 uses this to calculate the voltage vector $\underline{u}$ of the motor voltage, while a downstream pulse-width controller 123 uses this to derive the necessary switching commands $S_{R,S,T}$ for the invertor 108. In other rotation speed ranges, the variables are derived in a different manner, for example using the method of direct self-control DSR (once again, see the abovementioned document in this context).

The upper control loop described in FIG. 1 forms an inner control loop which allows highly dynamic control of the torque of the traction motor or motors. Superimposed on this is a second, lower control loop, which contains an adhesion controller 102. The adhesion controller 102 is intended to stabilize the drive in the case of varying friction conditions between the wheel 115 and the rail 116 and, if required, to attempt to find the traction maximum. For this purpose, it contains a traction force and slip controller as well as a device to search for the traction maximum. The interface between the two control loops is the dynamic nominal torque value $M_{s,nom}$ and the measured rotation speed $n_{shaft}$ of the motor shaft, or of the rotor of the traction motor. The dynamic nominal torque value $M_{s,nom}$ may in this case be composed of the steady-state nominal torque value $M_{T,nom}$ emitted by the adhesion controller 102 and an additional torque correction signal $M_{s,ud}$ from an intermediate-circuit connection, which is derived from the intermediate-circuit voltage $u_d$ by an additional intermediate-circuit antiphase controller 101 for damping oscillations in the DC intermediate circuit 105.

The superimposed second control loop, together with the adhesion controller 102, derives its information about the slip state from the rotation speed signal $n_{shaft}$, and is therefore provided with good rotation speed detection. In the case of the known control system structure according to FIG. 1, it is thus disadvantageous that the control system generally fails at low traction speeds (low rotation speeds $n_{shaft}$) since, on the one hand, the rotation speed information in this range is inadequate (number of pulses per revolution) and, on the other hand, actual rotation speed sensors 111 have non-ideal characteristics (eccentricity, signal noise resulting from pulse tolerances etc.). In practice, a very high, undesirable maintenance cost is required to overcome these problems.

Furthermore, in order to achieve low-wear operation, active damping of the drive mechanism is required, since the mechanical spring/mass system of the drive generally has only very weak damping. Owing to the said non-ideal characteristics of the rotation speed signal $n_{shaft}$, this is often not feasible, or is feasible only to an inadequate extent.

Finally, control methods using an impressed torque—as is shown in FIG. 4—are not able to use the falling branch of the wheel slip characteristic or traction characteristic A (power F plotted against the difference between the wheel and rail speeds dv) to set a stable operating point, for example for a power level F' and a speed difference $dv_{nom}$, since the increasing rotation speed is no longer counteracted by a higher load torque. Stabilization by means of a rotation speed controller is extremely time-critical, and the unavoidable dead time in the rotation speed measurement stimulates oscillations about the operating point (dashed lines in FIG. 4).

SUMMARY OF THE INVENTION

Accordingly, one object of the invention is to provide a novel control system for a drive having an asynchronous motor, in which stable, low-wear operation is possible at any operating point in the region of the traction maximum, and which manages in particular to as great an extent as possible without rotation speed sensors.

In the case of a control system of the type mentioned initially, the object is achieved in that the motor control system is designed as a stator frequency control system, in that an actual torque value for the asynchronous motor is derived within the motor controller, and in that the two control loops are connected to one another in such a way that the actual torque value from the motor controller is used as the actual value for adhesion control, and such that the adhesion controller presets a nominal stator frequency value for motor control.

The essence of the invention is a new split in the coupling between motor control and adhesion control, which split is linked to a preset stator frequency (nominal stator frequency). This has the following advantage: during operation, the load torque which is generated by the friction process and acts on the wheels is provided with stochastic stimuli. The advantage of the asynchronous motor is its steep rotation speed/torque characteristic (characteristic K in FIG. 5, which is comparable to FIG. 4), which permits only small rotation speed changes ($dv_1 \to dv_2$) for load torques ($F_1 \to F_2$) which are varying severely. This characteristic is utilized by presetting the stator frequency according to the invention, and uncontrolled acceleration of the wheelset is no longer possible. In the dynamic situation, the rotation speed fluctuations are considerably less, and, in the steady state, a natural operating point is produced between the motor characteristic K and the traction characteristic A. This provides the precondition for the superimposed adhesion controller to be able to set and optimize the wheel/rail operating point without any limitations.

One preferred embodiment of the control system according to the invention is distinguished by the fact that a motor monitor is provided within the motor control system and uses models to calculate the actual torque value from a plurality of input variables, that the asynchronous motor emits its mechanical power on a motor shaft at a rotation speed, that the asynchronous motor is supplied with appropriate phase currents from a controllable invertor, that the invertor is connected on the input side by means of the intermediate-circuit voltage to a DC intermediate circuit, and that the motor monitor takes the rotation speed, the phase currents and the intermediate-circuit voltage as input variables for calculating the actual torque value.

Modern bogie drives have very light damping, by virtue of their design. Mechanical oscillations of the rotor are also always evident as oscillations in the machine torque. In modern motor control systems, the motor monitors calculate this torque with good resolution and dynamic response from the purely electrical variables of the current and voltage. The application to mechanical damping can thus, in this embodiment, be derived from the already existing torque signal, and allows active damping of mechanical torsional oscillations without evaluating the rotation speed signal.

One preferred development of this embodiment is distinguished by the fact that a mechanical antiphase controller for damping oscillations of the mechanical drive run is provided within the second control loop, wherein the mechanical antiphase controller has the actual torque value as an input variable, wherein the mechanical antiphase controller emits at the output a frequency correction signal from mechanical damping, wherein the adhesion controller emits at the output a nominal stator frequency value, and wherein the nominal stator frequency value emitted to the motor controller is produced by superimposing the nominal stator frequency value and the frequency correction signal from mechanical damping, and possibly a frequency correction signal from an intermediate-circuit connection.

Other embodiments result from the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
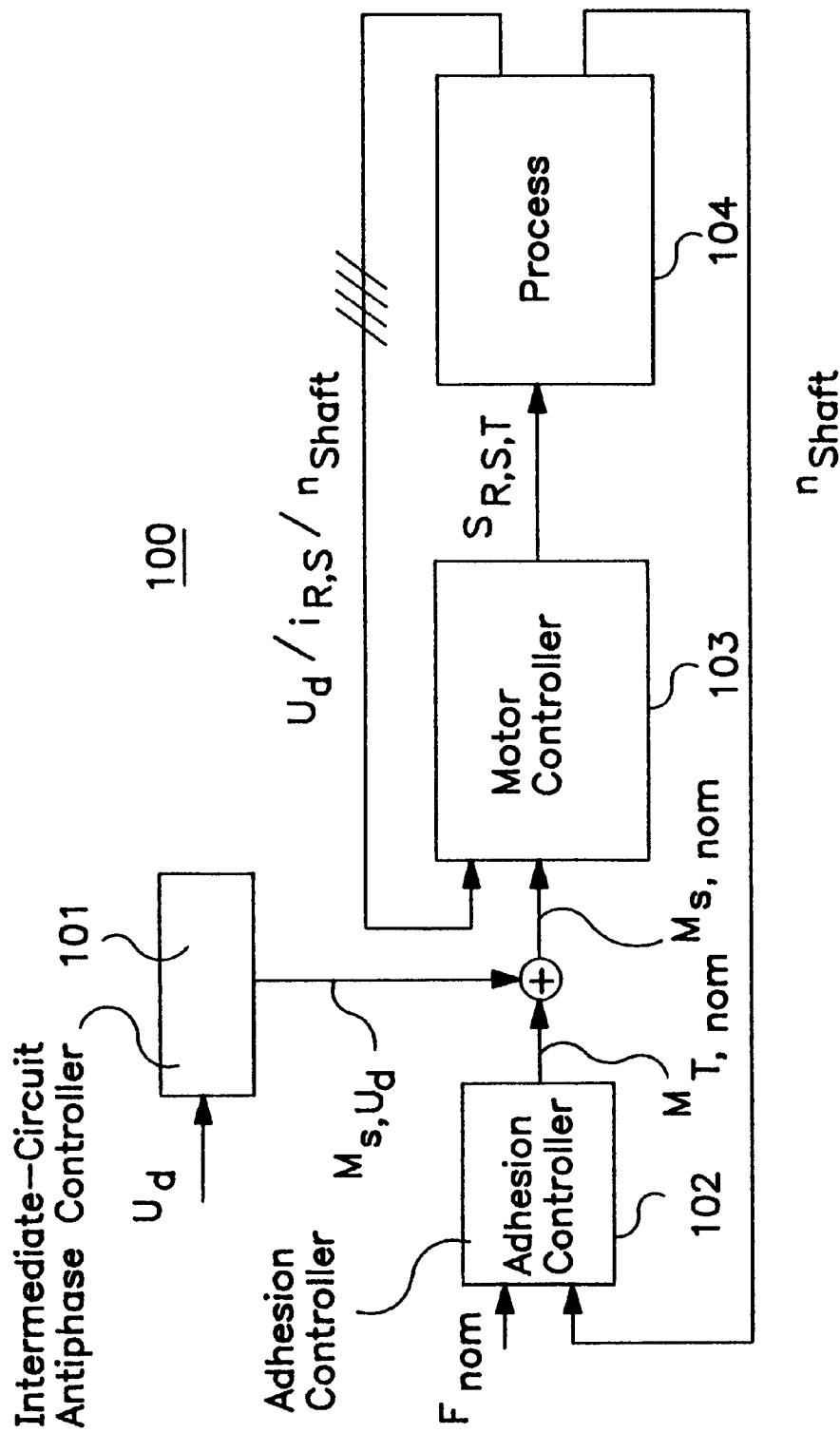
FIG. 1 shows the control structure of a torque-based asynchronous motor drive control system with adhesion monitoring, according to the prior art.
Figure 2:
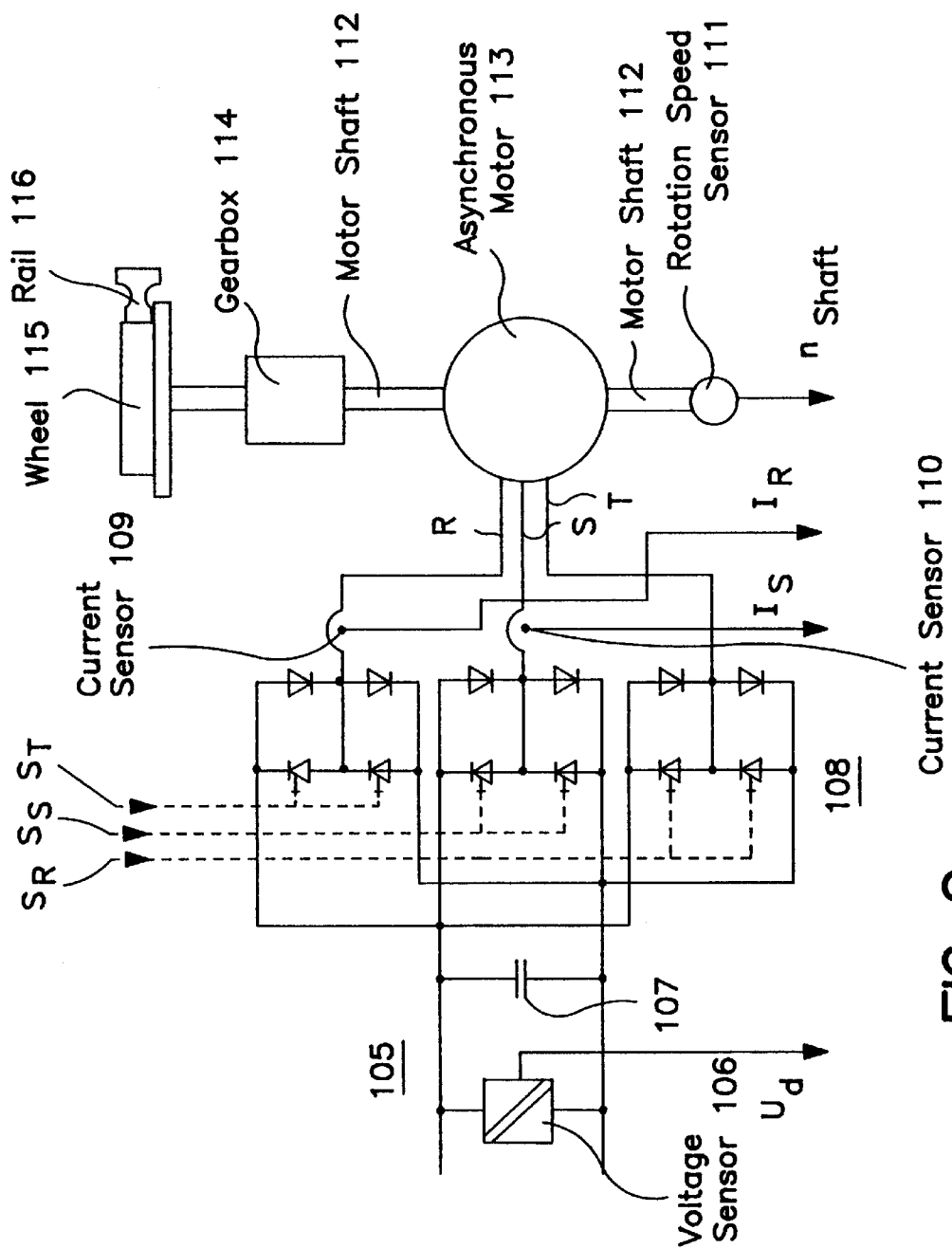
FIG. 2 shows examples of details of the process 104 from FIG. 1.
Figure 6:
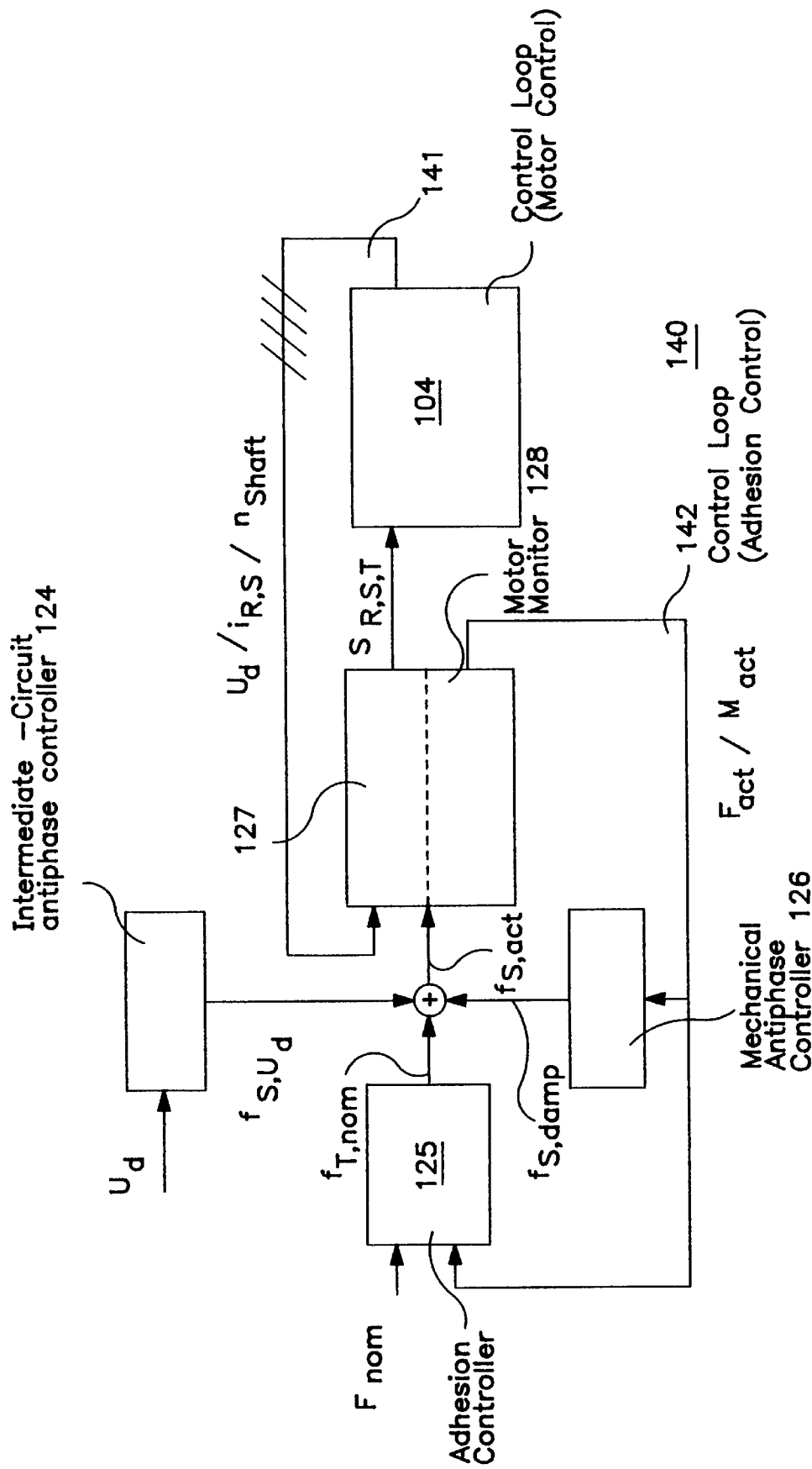
FIG. 6 shows the control structure, comparable to FIG. 1, according to a first preferred exemplary embodiment, for a control system according to the invention.

Referring now to the drawings, wherein like reference numerals designate identical or corresponding parts throughout the several views, FIG. 6 shows a preferred exemplary embodiment for a control system according to the invention in the form of a schematic control structure comparable to FIG. 1. The control system 140 once again comprises two control loops 141 and 142. The control loop 141 comprises the process block 104 and the block for the actual motor control, which is composed of a stator frequency controller 127 and a motor monitor 128. The control loop 142 is responsible for controlling the adhesion and comprises an adhesion controller 125, an intermediate-circuit antiphase controller 124, and a mechanical antiphase controller 126. According to the invention, the dynamic nominal stator frequency value $f_{s,nom}$ and the nominal torque value $M_{act}$ (calculated by the motor monitor 128) are interchanged as signals at the interface between the motor controller and adhesion controller. The process block 104 comprises the control path with the invertor, traction motor (ASM), drive mechanism and wheel/rail contact. This is actuated by the motor controller switching commands $S_{R,S,T}$. The output signals from the process 104 are the known variables for managing the motor control process, namely the phase currents $i_{R,S}$, the intermediate-circuit voltage $u_d$ and the rotation speed of the motor shaft $n_{shaft}$. The motor monitor 128 estimates the machine states that cannot be measured, such as the actual torque value $M_{act}$ and the actual stator flux value $\underline{Psi}_{act}$. The motor monitor 128 thus has the same task and the same design as the torque-based control method mentioned initially.

As already mentioned, the stator frequency controller 127 together with the motor monitor 128 represent the motor controller. The stator frequency controller 127 contains the high-dynamic-response control system for the stator frequency, the magnetization (the stator flux) and limitation of the machine torque. Hidden in the block are the various control algorithms for the voltage control range and field attenuation, which will be explained in more detail further below on the basis of the example, as well as the changeover between the methods. The stator frequency controller supplies the switching commands $S_{R,S,T}$ as the output for the invertor.

The mechanical antiphase controller 126 is provided for active damping of torsional oscillations in the drive run. The resonant frequencies in the torsion mechanism are filtered out from the torque signal (input variable: actual torque value $M_{act}$) by presetting the stator frequency. The mechanical antiphase controller uses this to provide a frequency correction signal $f_{s,damp}$, and applies this signal to the nominal stator frequency value $f_{T,nom}$ of the adhesion controller 125. The dynamic nominal stator frequency value $f_{s,nom}$ resulting from this then provides active damping of torsional oscillations.

The intermediate-circuit antiphase controller 124 uses the intermediate-circuit voltage $u_d$ signal to derive a frequency correction signal $f_{s,ud}$, and likewise applies this correction signal to the nominal stator frequency value. This results in active damping of oscillations in the intermediate-circuit voltage. Such damping is particularly important for DC vehicles.

The described control blocks 124 to 128 ensure that an operating point preset by the traction controller can be used in a stable manner with a corresponding nominal traction force value $F_{nom}$. In particular, this prevents slipping processes resulting from the steep gradient of the drive characteristic of the lower-level system (asynchronous motor with stator frequency control). It is thus possible for the higher-level traction control system no longer to have to influence the nominal stator frequency value $f_{T,nom}$ in a highly dynamic manner and, instead of this, it is possible for it to concentrate on setting the optimum operating point.

The traction control system described in this way thus has two main tasks: if the engineer's traction force requirements are low, it operates as a traction force control system in that it matches the stator frequency to the vehicle speed. If the preset traction force $F_{nom}$ can no longer be achieved with insufficient traction, a search algorithm is activated. This varies the operating point in an attempt to reach optimum traction and to utilize conditioning effects from wheel/rail pairing. In this case, it is possible to use proven methods, such as those known from the document Elektrische Bahnen [Electric railroads] 91(1993), Issue 5, pages 163 et seq. In order to search for the traction maximum, it is possible, for example, to vary the stator frequency and to set the search direction on the basis of the torque reaction.

The stator frequency controller 127 from FIG. 6 has the object of controlling the speed on the track and the magnitude of the stator flux vector (stator flux space vector) $\underline{Psi}$. In principle, any torque control method can be converted into stator frequency control for this purpose. However, it is necessary to draw a distinction between synchronous and asynchronous pulsing methods for the invertor. In the case of synchronous methods, the switching frequency is a multiple of the stator frequency. In contrast, the asynchronous methods are generally distinguished by the stator flux and torque being controlled independently. The magnitude or trajectory control of the stator flux space vector also has to be retained for stator frequency control. This leads to the vector on the envisaged path curve in the stator-fixed coordinate system (circle, hexagonal, 18-sided figure etc.), and ensures a stable operating point.

Figure 3:
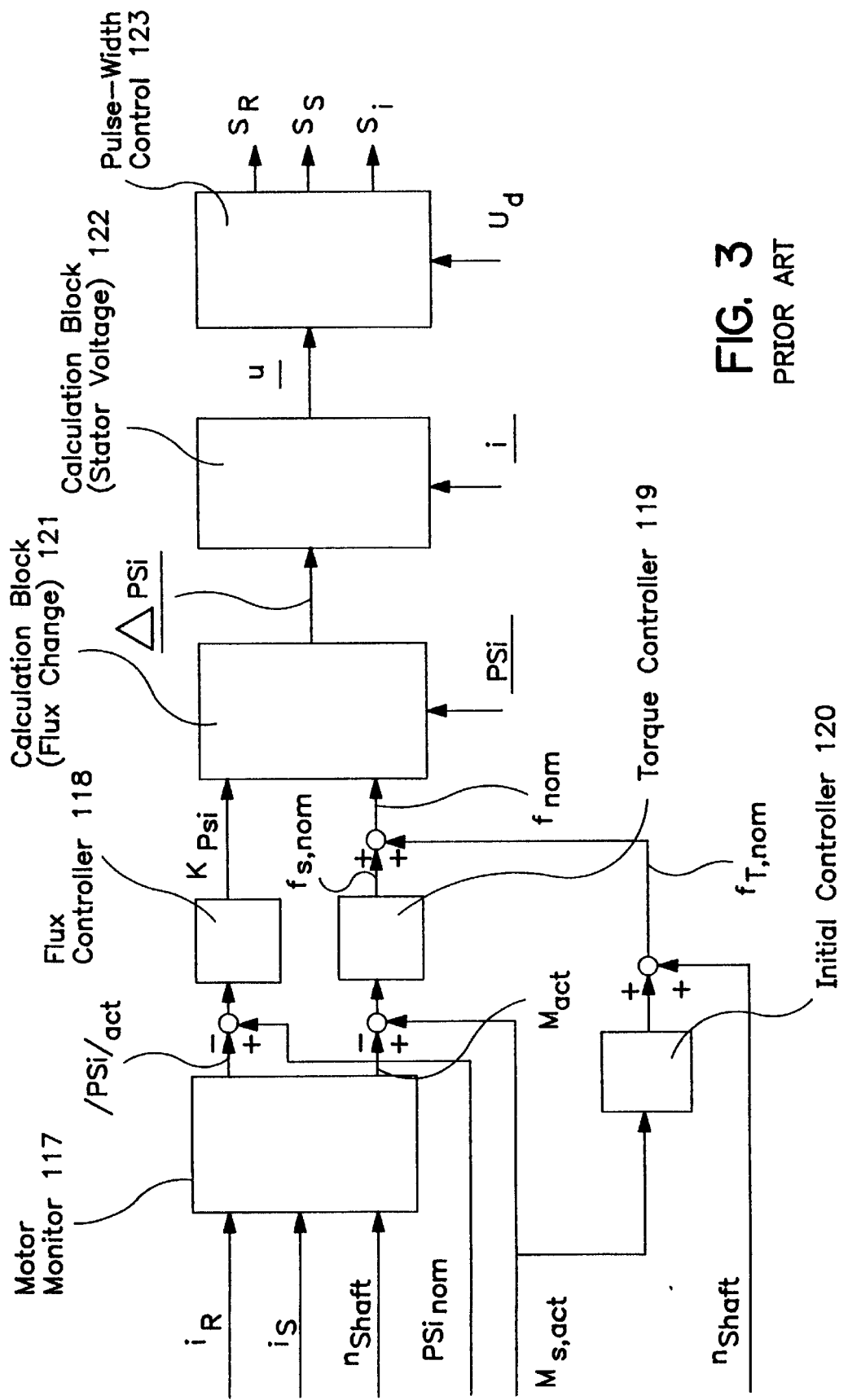
FIG. 3 shows details of the motor controller 103 from FIG. 1, using the example of indirect self-control (ISR)
Figure 4:
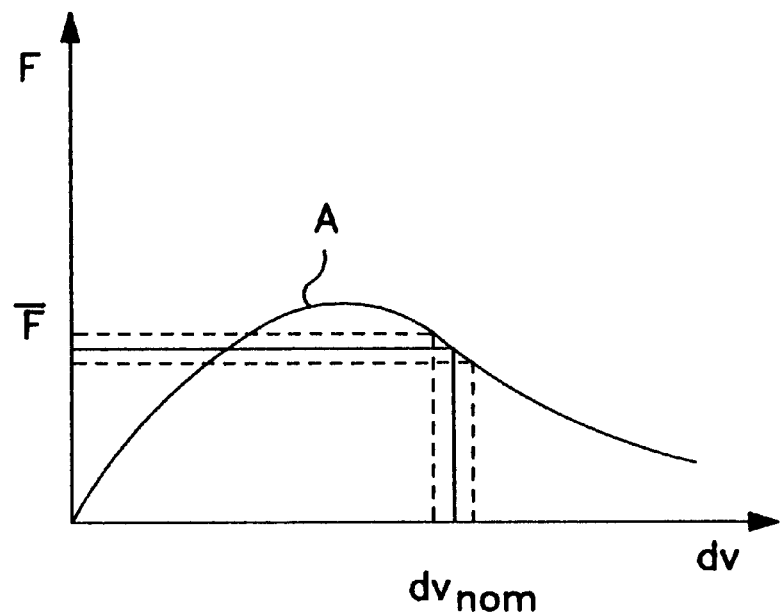
FIG. 4 shows the definition of the operating point on the wheel slip characteristic or traction characteristic for a torque-based asynchronous motor control system.
Figure 5:
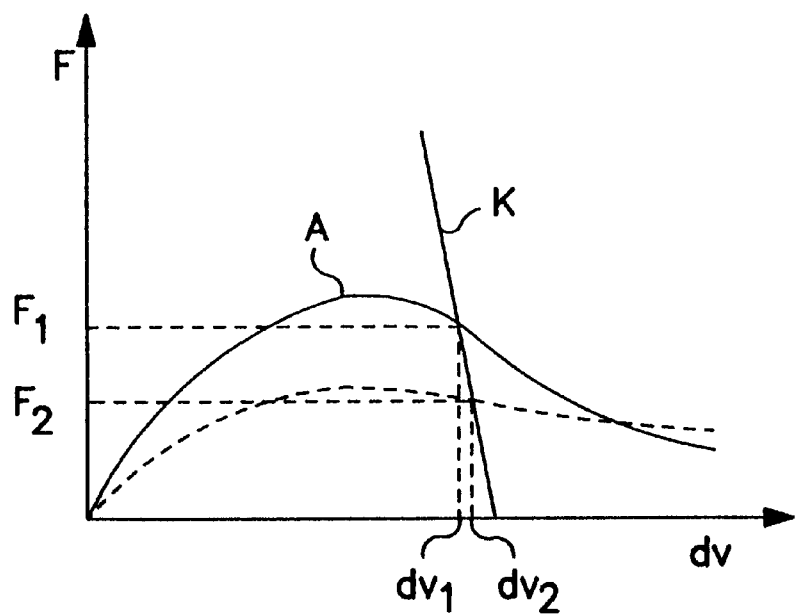
FIG. 5 shows the definition of the operating point on the wheel slip characteristic or traction characteristic for a stator-frequency-based asynchronous motor control system according to the invention.
Figure 7:
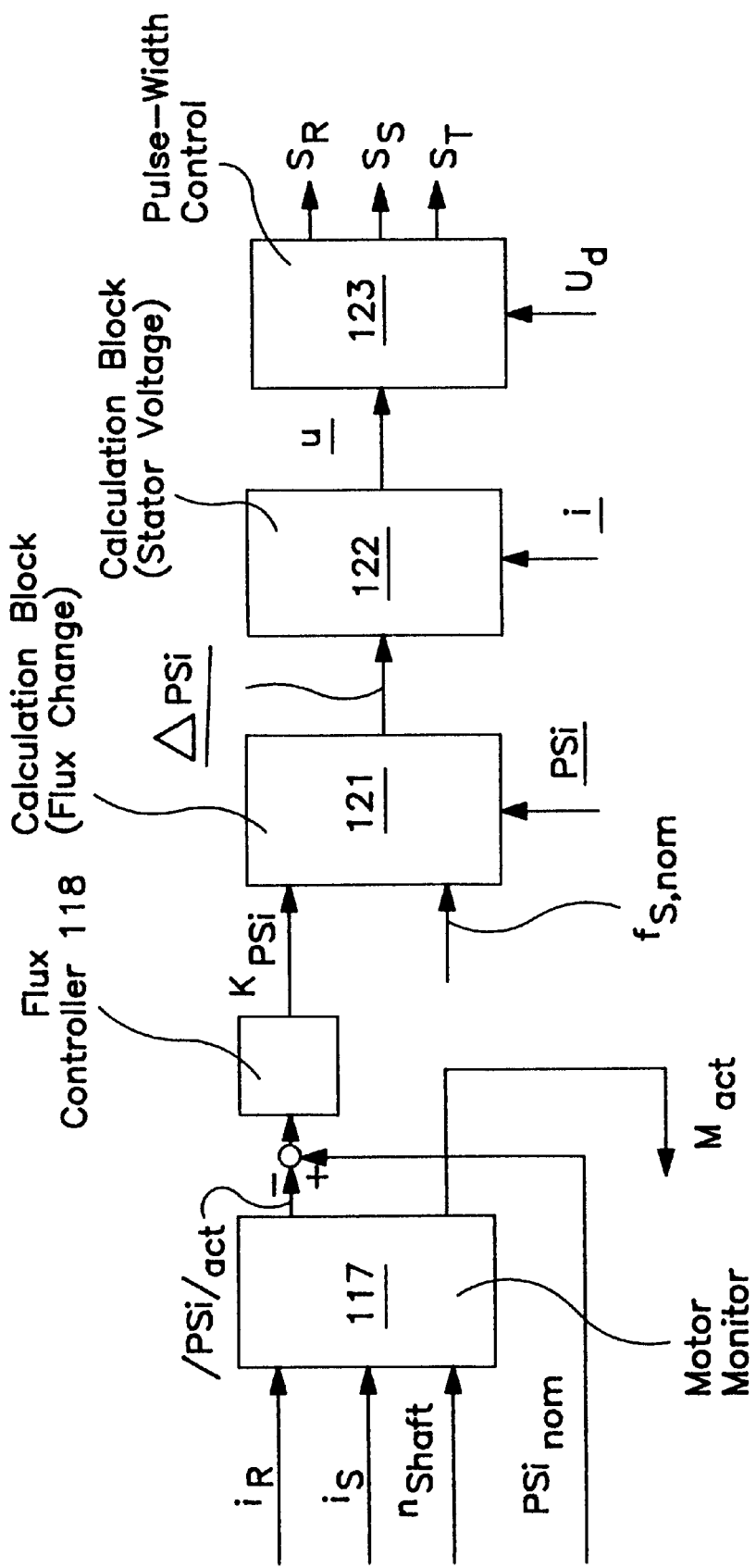
FIG. 7 shows the details, comparable to FIG. 3, of the motor control system from FIG. 6, using the example of indirect self-control (ISR)

In the case of stator flux control with a circular path curve, the angular velocity is preset by the torque controller 119 for torque-based control (FIG. 3). For conversion to stator frequency control according to FIG. 6, the torque controller—as shown in FIG. 7—is eliminated and the dynamic nominal stator frequency value $f_{s,nom}$ is preset directly by the adhesion controller (124, 125, 126 in FIG. 6).

Figure 8:
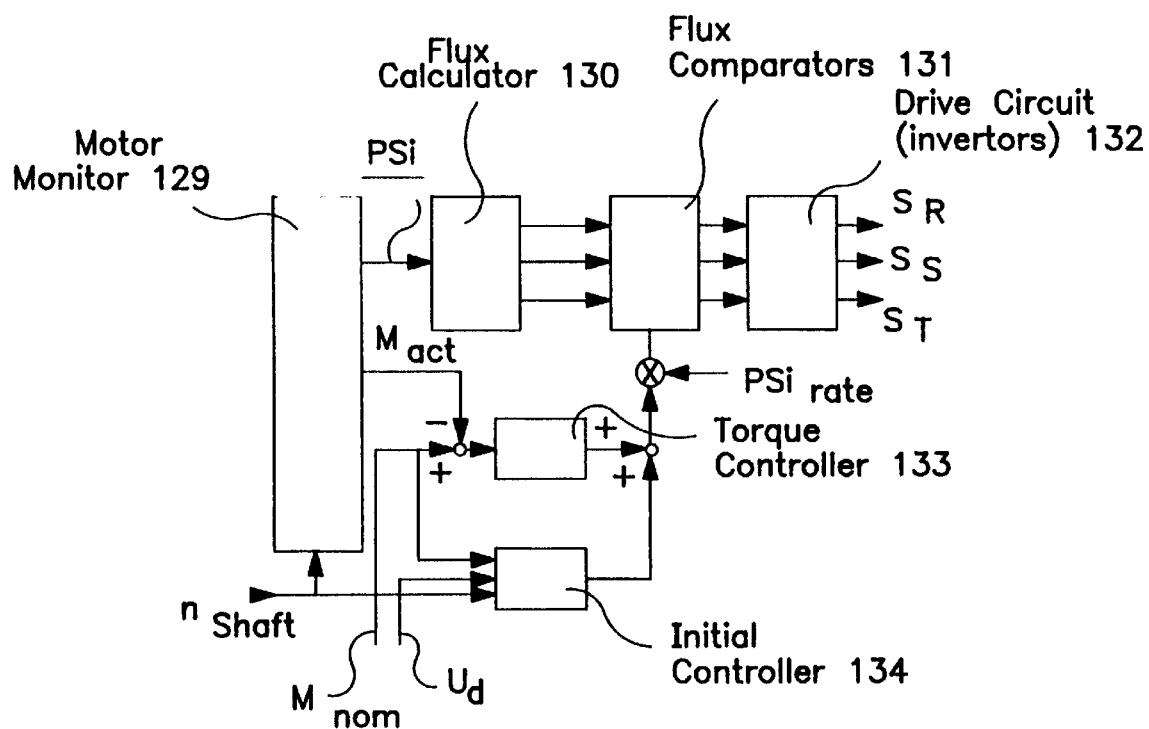
FIG. 8 shows details of the motor controller 103 from FIG. 1, using the example of direct self-control (DSR) in the weak-field region (high rotation speeds)
Figure 9:
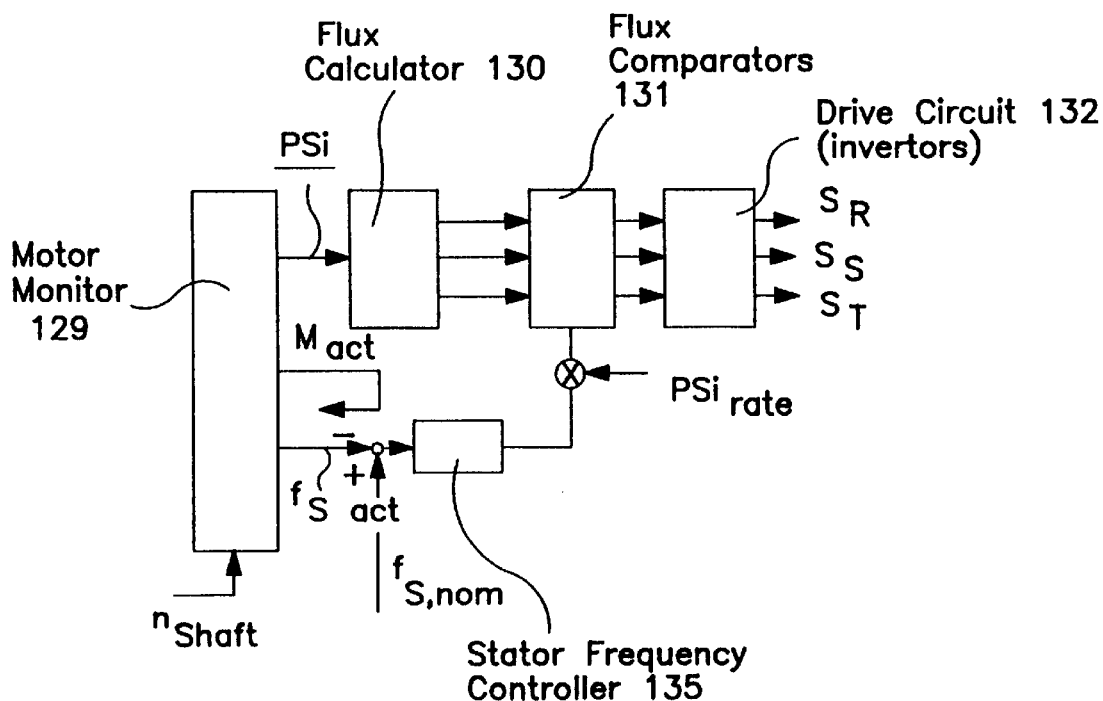
FIG. 9 shows the design, comparable to FIG. 8, for a stator-frequency-based motor control system according to FIG. 6.

In the case of synchronous methods, in which the switching frequency is a multiple of the stator frequency, as is the case, for example, with direct self-control (DSR) in the weak-field region, a change from torque-based control to stator-frequency-based control takes place as indicated in the case of the change from FIG. 8 to FIG. 9. In the case of torque-based control in FIG. 8, the motor monitor 129 calculates the stator flux vector $\underline{Psi}$ and the actual torque value $M_{act}$. A flux calculator 130 uses the stator flux vector $\underline{Psi}$ to calculate the components in a fixed coordinate system, and these are then supplied to flux comparators 131 and compared with a nominal flux value $Psi_{nom}$. A drive circuit 132 uses the resultant comparator signals to derive the required switching commands $S_{R,S,T}$ for the invertor. The nominal stator flux value $Psi_{nom}$ is obtained by multiplying a rated stator flux value $Psi_{rate}$ by a flux correction value, which is produced by superimposing the output variables from a torque controller 133 and an initial controller 134.

In the case of the corresponding stator-frequency-based control system in FIG. 9, the torque controller and the initial controller are replaced by a stator frequency controller 135. The stator frequency controller 135 compares the actual stator frequency value $f_{s,act}$ which, in the case of asynchronous clock pattern, is already known from the start or can be derived easily from the clock pattern, with the nominal stator frequency value $f_{s,nom}$ and, instead of the torque controller, produces the necessary flux correction value, which is multiplied by the rated stator flux value $Psi_{rate}$.

Figure 10:
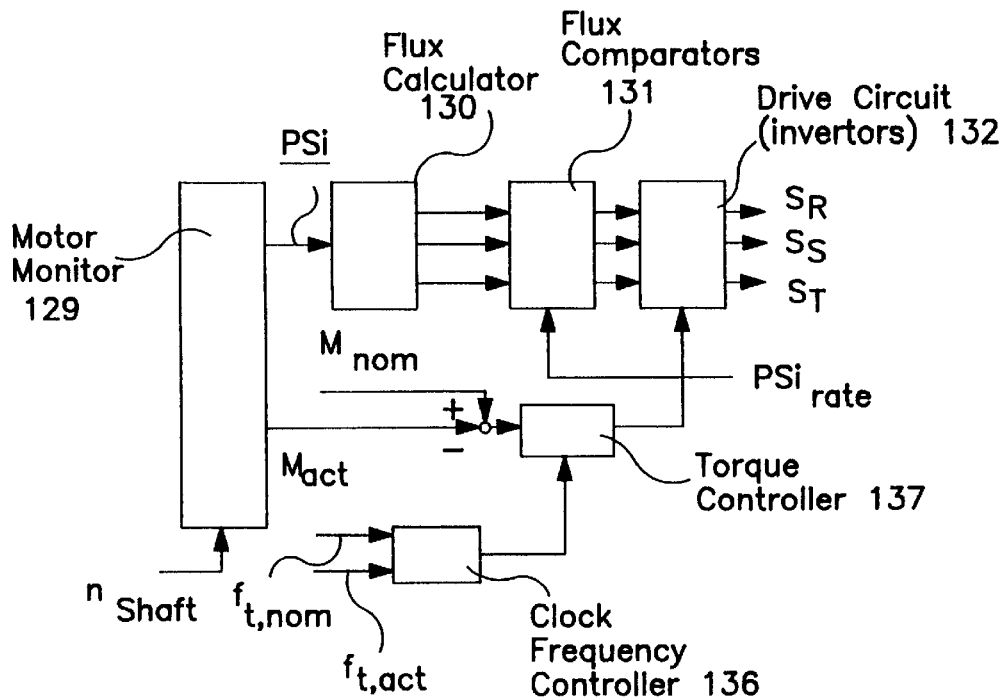
FIG. 10 shows details of the motor controller 103 from FIG. 1, using the example of direct self-control (DSR) for medium rotation speeds.
Figure 11:
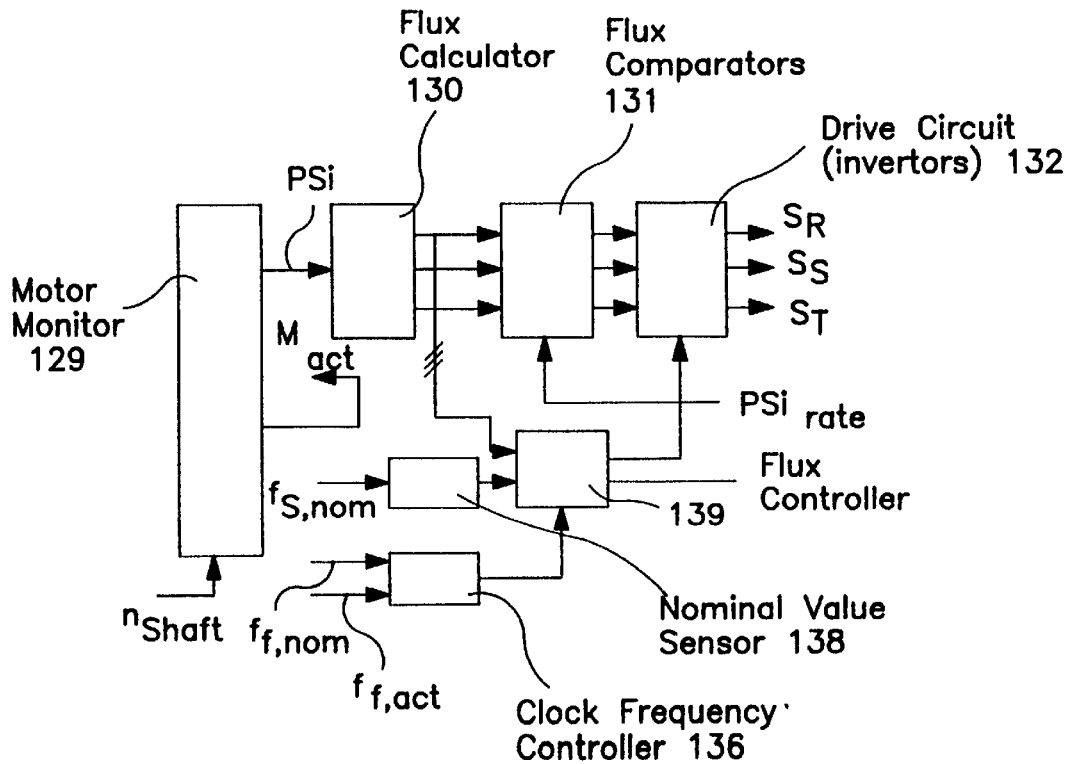
FIG. 11 shows the design, comparable to FIG. 10, for a stator-frequency-based motor control system according to FIG. 6.

In the direct self-control (DSR) method, a two-point torque controller 137 is used, according to FIG. 10, to decide for a torque-based control system whether a torque-raising external voltage or a torque-reducing zero voltage is preset (traction mode). A clock frequency controller 136 compares the nominal clock frequency value $f_{t,nom}$ and an actual clock frequency value $f_{t,act}$ and on this basis sets the two-point hysteresis of the torque controller 137. In the case of stator flux control systems whose path curves are optimized to the switching frequency (for example which are hexagonal), the track speed of the flux space vector must be controlled in order to achieve the same torque response at the steady-state stator-frequency-controlled operating point as in the case of torque control. A two-point flux controller 139 is therefore used for the change to stator-frequency-based control according to FIG. 11, and this changes the track speed along a nominal value function which is predetermined by a nominal value sensor 138 within each sector. The nominal value sensor 138 takes account of the applied flux path curve (hexagon, 18-sided figure etc.) and the load dependency (distortion flux). The mean track speed, which results from the two invertor states of zero voltage and external voltage, is slaved to the desired nominal value within a tolerance band. The width of the tolerance band (two-point hysteresis) is once again predetermined by the clock frequency controller 136.

Overall, the control system according to the invention results in:

an improved dynamic response (that is to say more traction force, better damped mechanical oscillations in the drive mechanism, shorter control time); and simplified introduction to service (fewer parameters, conceptually and physically better solution approach with stator frequency preset).

Obviously, numerous modifications and variations of the present invention are possible in light of the above teachings. It is therefore to be understood that, within the scope of the appended claims, the invention may be practiced otherwise than as specifically described herein.

LIST OF DESIGNATIONS

| | |
|---|---|
| 100 | Control system (torque-based) |
| 101,124 | Intermediate-circuit antiphase controller |
| 102,125 | Adhesion controller |
| 103 | Motor controller |
| 104 | Process |
| 105 | DC intermediate circuit |
| 106 | Voltage sensor (intermediate-circuit voltage) |
| 107 | Intermediate-circuit capacitor |
| 108 | Invertor |
| 109,110 | Current sensors (phase current) |
| 111 | Rotation speed sensor (motor shaft) |
| 112 | Motor shaft (ASM) |
| 113 | Asynchronous motor (ASM) |
| 114 | Gear box |
| 115 | Wheel |
| 116 | Rail |
| 117,128 | Motor monitor |
| 118 | Flux controller |
| 119 | Torque controller |
| 120 | Initial controller |
| 121 | Calculation block (flux change) |
| 122 | Calculation block (stator voltage) |
| 123 | Pulse-width control |
| 126 | Mechanical antiphase controller |
| 127 | Stator frequency controller |
| 129 | Motor monitor |

-continued
LIST OF DESIGNATIONS

| | |
|---|---|
| 130 | Flux calculator |
| 131 | Flux comparators |
| 132 | Drive circuit (invertor) |
| 133 | Torque controller |
| 134 | Initial controller |
| 135 | Stator frequency controller |
| 136 | Clock frequency controller |
| 137 | Torque controller |
| 138 | Nominal value sensor |
| 139 | Flux controller |
| 140 | Control system (stator-frequency-based) |
| 141 | Control loop (motor control) |
| 142 | Control loop (adhesion control) |
| A | Traction characteristic |
| dv | Difference between the wheel and rail speeds |
| $dv_{nom}$ | Nominal difference between the wheel and rail speeds |
| $F, F_1, F_2$ | Traction force |
| $f_{s,act}$ | Actual stator frequency value |
| $f_{s,nom}$ | Nominal stator frequency value (dynamic) |
| $f_{s,damp}$ | Frequency correction signal from mechanical damping |
| $f_{s,ud}$ | Frequency correction signal from the intermediate-circuit connection |
| $f_{T,nom}$ | Nominal stator frequency value from the adhesion controller |
| $f_{t,act}$ | Actual clock frequency value |
| $f_{t,nom}$ | Nominal clock frequency value |
| $F_{act}$ | Actual traction force value |
| $F_{nom}$ | Nominal traction force value |
| $\underline{i}$ | Stator current vector |
| $i_{R,S}$ | Phase current (asynchronous motor) |
| K | ASM characteristic (steady-state) |
| $k_{Psi}$ | Stator flux correction value |
| $M_{act}$ | Actual torque value (motor monitor) |
| $M_{s,nom}$ | Nominal torque value (dynamic/motor controller) |
| $M_{T,nom}$ | Nominal torque value (static/adhesion controller) |
| $M_{s,ud}$ | Torque correction signal (intermediate-circuit connection) |
| $n_{shaft}$ | Rotation speed (motor shaft) |
| $\underline{Psi}$ | Stator flux vector |
| $\underline{Psi}_{act}$ | Actual stator flux value (motor monitor) |
| $Psi_{rate}$ | Rated stator flux value |
| $Psi_{nom}$ | Nominal stator flux value |
| $\Delta \underline{Psi}$ | Change (stator flux vector) |
| $S_{R,S,T}$ | Switching command (invertor) |
| $u_d$ | Intermediate-circuit voltage |

What is claimed as new as desired to be secured by Letters Patent of the United States is:

1. A control system for a drive having an asynchronous motor for a railroad vehicle, the control system comprising:

a first control loop for motor control, and a second control loop which is connected to the first control loop and has an adhesion controller, wherein the motor control system is designed as a stator frequency control system, wherein an actual torque value for the asynchronous motor is derived within the motor control system, and wherein the two control loops are connected to one another in such a manner that the actual torque value from the motor control system is used as the actual value for the adhesion controller, and wherein the adhesion controller presets a nominal stator frequency value for the motor control system.

2. The control system as claimed in claim 1, wherein a motor monitor is provided within the motor control system and uses models to calculate the actual torque value from a plurality of input variables.

3. The control system as claimed in claim 2, wherein the asynchronous motor emits its mechanical power on a motor shaft at a rotation speed, wherein the asynchronous motor is supplied with appropriate phase currents from a controllable invertor, wherein the invertor is connected on the input side to a DC intermediate circuit having an intermediate-circuit voltage, and wherein the motor monitor takes the rotation speed, at least two of the phase currents and the intermediate-circuit voltage as input variables for calculating the actual torque value.

4. The control system as claimed in claim 3, wherein the motor monitor at the same time calculates the actual stator flux value from the plurality of input variables, and wherein switching commands for the invertor are derived from the actual stator flux value, a predetermined nominal stator flux value and the nominal stator frequency value.

5. The control system as claimed in claim 1, wherein an intermediate-circuit antiphase controller for damping oscillations in the DC intermediate circuit is provided within the second control loop, wherein the intermediate-circuit antiphase controller has the intermediate-circuit voltage as an input variable and emits at the output a frequency correction signal from the intermediate-circuit connection, wherein the adhesion controller emits at the output a nominal stator frequency value, and wherein the nominal stator frequency value emitted to the motor controller is produced by superimposing the nominal stator frequency value and the frequency correction signal from the intermediate-circuit connection.

6. The control system as claimed in claim 1, wherein a mechanical antiphase controller for damping oscillations of a mechanical drive run is provided within the second control loop, wherein the mechanical antiphase controller has the actual torque value as an input variable, wherein the mechanical antiphase controller emits at the output a frequency correction signal from mechanical damping, wherein the adhesion controller emits at the output a nominal stator frequency value, and wherein the nominal stator frequency value emitted to the motor controller is produced by superimposing the nominal stator frequency value and the frequency correction signal from mechanical damping, and optionally a frequency correction signal from the intermediate-circuit connection.

7. The control system as claimed in claim 1, wherein the motor control system is designed as a direct self-control system in the medium rotation speed range and in the weak-field range, and is designed as an indirect self-control system in the starting range.

* * * * *